United States Patent
Homola

(10) Patent No.: US 6,221,119 B1
(45) Date of Patent: Apr. 24, 2001

(54) SLURRY COMPOSITION FOR POLISHING A GLASS CERAMIC SUBSTRATE

(75) Inventor: Andrew M. Homola, Morgan Hill, CA (US)

(73) Assignee: Komag, Inc., San Jose, CA (US)

( * ) Notice: Subject to any disclaimer, the term of this patent is extended or adjusted under 35 U.S.C. 154(b) by 0 days.

(21) Appl. No.: 09/353,247

(22) Filed: Jul. 14, 1999

(51) Int. Cl.[7] .............................. C09G 1/802; C09G 1/04; B24B 1/00; C09K 3/14
(52) U.S. Cl. ............................. 51/309; 51/307; 106/3; 510/167; 510/180; 510/181; 510/397; 451/36
(58) Field of Search .............................. 51/307, 308, 309; 106/3; 438/692, 693; 510/175, 397, 165, 181, 167, 180; 451/36

(56) References Cited

U.S. PATENT DOCUMENTS

| | | | | |
|---|---|---|---|---|
| 4,222,747 | * | 9/1980 | Dauguet et al. | 51/309 |
| 4,676,920 | * | 6/1987 | Culshaw | 252/163 |
| 4,956,015 | * | 9/1990 | Okajima et al. | 106/3 |
| 5,123,218 | * | 6/1992 | Karlsrud | 51/281 SF |
| 5,266,088 | * | 11/1993 | Sandusky et al. | 51/309 |
| 5,286,405 | * | 2/1994 | Rennie et al. | 252/174.17 |
| 5,366,542 | * | 11/1994 | Yamada et al. | 51/309 |
| 5,532,307 | * | 7/1996 | Bogan, Jr. | 524/407 |
| 5,567,353 | * | 10/1996 | Bogan, Jr. | 252/313.1 |
| 5,639,296 | * | 6/1997 | Garino | 106/400 |
| 5,728,308 | * | 3/1998 | Muroyama | 216/88 |
| 5,733,819 | * | 3/1998 | Kodoma et al. | 438/692 |
| 5,738,800 | * | 4/1998 | Hosali et al. | 216/99 |
| 5,759,917 | * | 6/1998 | Grover et al. | 438/690 |
| 5,783,489 | * | 7/1998 | Kaufman et al. | 438/692 |
| 5,861,054 | * | 1/1999 | Miyashita et al. | 106/3 |
| 5,863,883 | * | 1/1999 | Yam et al. | 510/407 |
| 5,876,490 | * | 3/1999 | Ronay | 51/309 |
| 5,997,620 | * | 12/1999 | Kodama et al. | 51/309 |
| 6,022,837 | * | 2/2000 | Oowaki | 106/3 |

* cited by examiner

Primary Examiner—Michael Marcheschi

(57) ABSTRACT

A slurry in accordance with the invention comprises $CeO_2$ polishing particles and sodium polyacrylate in an aqueous solution. This slurry is used to polish a glass or glass ceramic substrate. I have discovered that adding sodium polyacrylate to a $CeO_2$ slurry improves the polishing rate without causing a major negative impact on the slurry stability or redispersibility. In addition, the addition of the sodium polyacrylate does not cause a great deal of foaming. This polishing process can be used to prepare substrates for the manufacture of magnetic disks.

17 Claims, 4 Drawing Sheets

SLURRY COMPOSITION FOR POLISHING A GLASS CERAMIC SUBSTRATE

BACKGROUND OF THE INVENTION

This invention pertains to methods for polishing glass or glass ceramic substrates used to manufacture of magnetic disks. This invention also pertains to slurry compositions for polishing such glass or glass ceramic substrates A typical prior art process for manufacturing a magnetic disk comprises the following steps:

1. A substrate is polished and textured.
2. An underlayer (e.g. Cr, an alloy of Cr, NiP, NiAl or other materials), a magnetic alloy layer (e.g. a Co alloy), and a protective overcoat (e.g. carbon or hydrogenated carbon) are sputtered, in that order, onto the substrate.
3. A lubricant layer is applied to the protective overcoat. Typical substrates used for magnetic disks comprise NiP-plated aluminum, chemically strengthened glass, or glass-ceramic.

It is necessary to polish a glass or glass ceramic substrate before depositing the various layers thereon. The most effective polishing slurries for polishing glass contain $CeO_2$, $ZrO_2$, or $Fe_2O_3$. Of these, $CeO_2$ is the most commonly used.

It would be desirable to increase the polishing rate exhibited by slurries. However, in doing so, there are several slurry characteristics one would want to improve.

1. Slurry particles have a tendency to "settle". It would be desirable to slow the rate of settling.
2. It would also be desirable to prevent the slurry from foaming during use.
3. It would also be desirable to ensure that the slurry is "redispersible." By redispersible, I mean that if the slurry particles settle, they can be redispersed within the slurry.

SUMMARY

A slurry in accordance with my invention comprises oxide polishing particles and a polyacrylate. In one embodiment, the polishing particles are $CeO_2$ particles, and the polyacrylate is sodium polyacrylate. However, in lieu of sodium, other monovalent ions can be used. For example, potassium polyacrylate or ammonium polyacrylate can be used. The $CeO_2$ particles and the polyacrylate are typically in an aqueous solution. This solution can contain other additives as well.

In one embodiment, the slurry of the present invention is used to polish a glass or a glass ceramic substrate. The slurry can be used in conjunction with any of a number of types of polishing apparatus, e.g. ring polishers, planetary polishing apparatus, or other polishing machines. The polishing apparatus typically comprises one or more polishing pads that push against a surface of the substrate being polished. The slurry is introduced into the space between the polishing pad and the substrate so that the slurry can be used to polish the substrate.

I have discovered that adding the polyacrylate to a $CeO_2$ slurry enhances the polishing rate of the slurry without adversely impacting the slurry settling rate, without negatively impacting redispersibility, and without causing excessive foaming.

In addition to, or in lieu of using $CeO_2$ particles, other oxide particles can be used in conjunction with my invention, e.g. oxides such as $ZrO_2$, $ThO_2$, $SnO_2$, $Cr_2O_3$, $Al_2O_3$ or $Fe_2O_3$ can be used.

After polishing, the substrate is used to manufacture a magnetic disk. This is typically accomplished by sputtering an underlayer, a magnetic layer, and a protective overcoat on the substrate. (Additional layers can also be deposited on the substrate, depending upon the design of the magnetic disk. In addition, deposition techniques other than sputtering such as plating or evaporation can also be used.)

DETAILED DESCRIPTION

Figure 1:
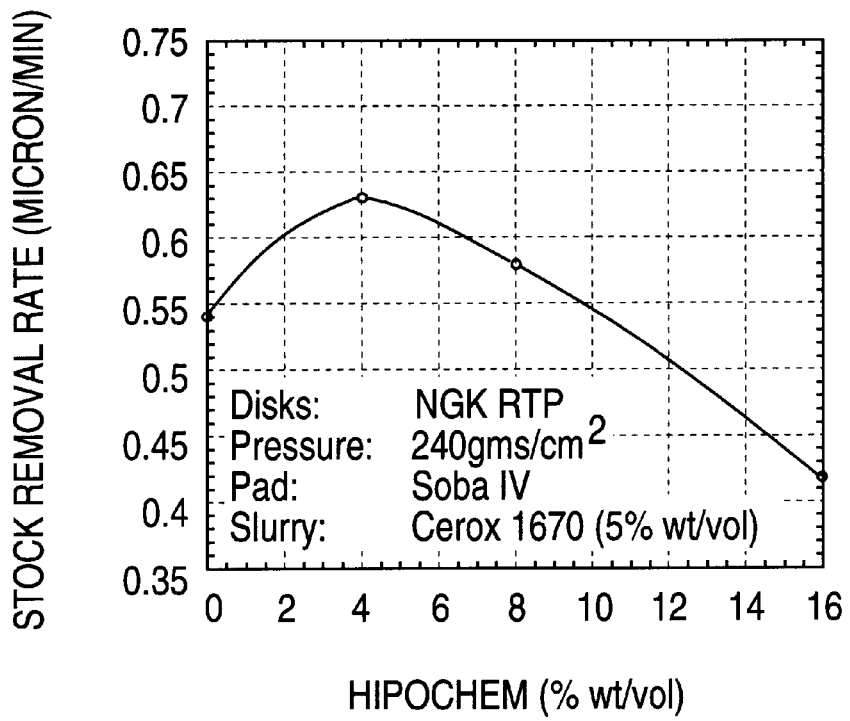
FIG. 1 illustrates the relation between the polishing rate and the concentration of a polyacrylate additive in a slurry in accordance with my invention.

A process in accordance with my invention uses a glass or glass ceramic substrate in the manufacture of a magnetic disk. The exact composition of the substrate is not critical. In one embodiment, I use substrate type NGK M4 RTP, manufactured by NGK Corporation of Japan. (This is a type of glass ceramic substrate.) However, other silica-containing substrates can also be used, e.g. a glass substrate. The glass substrate can be either chemically strengthened or non-chemically strengthened. In one embodiment, the substrate is disk-shaped and has a diameter of about 95 mm. However, other substrate sizes can also be used.

The substrate is subjected to a grinding process to ensure that the substrate is substantially flat. This is accomplished by using a grinding stone embedded with diamond particles, or by using a slurry comprising large abrasive $Al_2O_3$ particles. This process typically leaves the substrate with cracks, fractures, or other mechanical defects that are subsequently removed by polishing.

The substrate is then subjected to two polishing steps: a first, coarse polishing step and a second, fine polishing step. During the first, coarse polishing step, 20 to 50 µm of substrate material is removed. The first step is accomplished with a slurry comprising large (2 to 3 µm) $CeO_2$ particles in water. The concentration of the $CeO_2$ particles is between 15 and 20% wt/vol. (By 15 and 25 %wt/vol, I mean between 15 and 25 grams in 100 ml of water.)

During the second, fine polishing step, between 2 and 5 µm of substrate material is removed. This polishing step is typically accomplished using smaller (0.5 to 1 µm) $CeO_2$ particles in water. The concentration of the $CeO_2$ particles is between 1 to 5% wt/vol. At the conclusion of this step, the surface roughness of the substrate has a Ra of about 3 angstroms. ("Ra" is a well-known measure of surface roughness.)

Of importance, in addition to $CeO_2$ particles, the slurry used in the first and second polishing steps also comprises a polyacrylate. The polyacrylate can be sodium polyacrylate in a concentration between 2 and 6% wt/vol. The remainder of the slurry solution is typically water, although other additives may be present.

I have discovered that the above-described slurry has the following beneficial properties. First, it provides an enhanced polishing rate (compared to the polishing rate exhibited by a $CeO_2$ slurry without the polyacrylate).

Second, the polyacrylate tends to slow settling of the $CeO_2$ particles. Third, the polyacrylate does not promote foaming of the slurry during use. Fourth, the polyacrylate does not negatively impact redispersiblity.

Experimental Results

To measure the effectiveness of the slurry solution of the present invention, I compared various characteristics of a slurry in accordance with my invention with other slurries. To perform these tests, I used a single-disk polisher, similar to those manufactured by Strasbough Corporation of San Luis Obispo, Calif. I used a load of 9.6 kg, which translates into a pressure of 254 grams/cm$^2$. The speed of the polishing pad was 243 rpm, while the spindle (disk) speed was 123 rpm. The slurry was supplied to the disk/pad surfaces in a drop-wise manner with a flow rate of 5 ml/min. The temperature of the slurry was not permitted to exceed 40° C. The results were as follows.

TABLE I

| Additive Control Surfactants | Description | Surfactant Conc. (% wt/vol.) | CEROX 1663 Conc. (% wt/vol.) | Polishing Rate (μm/min) | Delta % |
|---|---|---|---|---|---|
| | CEROX 1663 | None | 5 | 0.54 | 0 |
| | Sodium Polyacrylate (2K) | 4 | 5 | 0.63 | 17 |
| | POIZ 530 | 5 | 5 | 0.65 | 20 |
| | HIPOCHEM SS-100 | 5 | 5 | 0.61 | 13 |
| | Polyethyleneimine (PEI) | 2 | 5 | 0.01 | −98 |
| Chelators | Ferrous Sulfite (Mohr's salt) | 2 | 5 | 0.18 | −67 |
| | Ammonium Molybdate | 2 | 5 | 0.61 | 13 |
| | Cerium Hydroxide | 2 | 5 | 0.59 | 9 |
| | Zinc Sulfate | 2 | 5 | 0.45 | −18 |
| Abrasives | Colloidal $CeO_2$ (10–20 nm size particles) | 10 | None | 0.29 | −46 |
| | Colloidal $CeO_2$ (10–20 nm size particles) | 2 | 5 | 0.59 | 9 |
| | Alumina WA30 | 2 | 5 | 0.53 | −2 |
| | Alumina/ceria | 10 | None | 0.29 | −46 |
| | Alumina/ceria | 10 | None | 0.15 | −72 |
| | Diamond (MYPOLOX) | 1 | 5 | .63 | 17 |

In Table I above, Cerox 1663 is a commercially available $CeO_2$ slurry without a polyacrylate surfactant. Cerox 1663 is manufactured by Rhone Poulenc of France. POIZ 530 is a polymeric surfactant (sodium polyacrylate) and is manufactured by KAO Corp. of Japan. HIPOCHEM SS-100 is chemically similar to POIZ 530, and is manufactured by High Point Chemical Corp. of High Point, N.C. Mypolex is a diamond slurry.

The Cerox 1663 was used as a control. The column "Delta" in Table I refers to the difference between the polishing rate for Cerox 1663 and the polishing rate for Cerox 1663 plus the indicated additive. As can be seen, the three polyacrylates increased the slurry polishing rate, which is a desirable result.

FIG. 1 illustrates the relationship between the removal rate and the concentration of the polyacrylate surfactant. The disk used in the experiment of FIG. 1 was an NGK RTP class ceramic substrate. The polyacrylate was sodium polyacrylate. The total polishing time was 8 minutes. The polishing pressure was 240 grams/cm$^2$. A SUBA IV polishing pad, manufactured by Rodel Nitta Co. of Japan was used. The slurry comprised 5% wt/vol of $CeO_2$ particles in water. As can be seen, without the surfactant, the polishing rate was about 0.54 microns/minute. At 4% wt/vol of the surfactant, the polishing rate reached 0.63 microns/minute. Thereafter, the polishing rate fell with increased surfactant concentration. I attribute the reduction in the stock removal rate to an increase in viscosity of the slurry and consequently, the reduction in intensity of particle/surface interactions. I expect that if one increases the $CeO_2$ concentration, one can increase the polyacrylate concentration to enhance the polishing rate.

Although the above-described experiments were performed using the process parameters listed above, in other embodiments, other process parameters can be used. Merely by way of example, a method in accordance with my invention using the above-mentioned Strasbough apparatus can use a load between 4.6 and 13.6 kg, which translates into a pressure between 10 and 360 grams/cm$^2$. The speed of the polishing pad can be between 243 and 800 rpm, while the spindle (disk) speed can be between 123 and 560 rpm. Other parameters can be used as well.

I also performed experiments to determine the effect of a polyacrylate on the slurry stability. The results of these experiments are listed in Table II below.

TABLE II

| Surfactant | Slurry Stability (% settled in 3 min) | Foaming (% foam based on total volume) | Redispersibility (after 24 hours settling) |
|---|---|---|---|
| Control, MIREK E30, 15% wt/vol | 100 | 1 | Yes |
| OAKITE PCL 405 | 100 | 62 | No |
| AMBERCLEAN 520 | 97 | 7 | Yes |
| NURINSE BR10 | 91 | 31 | Yes |
| HDC 905 | 100 | 107 | Partially |
| Sodium Polyacrylate (2K) | 21 | 23 | Yes |
| MIPOX 2305 | 5 | 75 | Partially |
| POIZ 530 | 10 | 15 | Yes |
| SP2200 | 100 | 142 | No |
| HIPOCHEM SS-100 | 17 | 22 | Yes |
| SP2201 | 100 | 125 | No |
| OAKITE TCL-150 | 100 | 157 | No |
| OAKITE TCL 405 | 86 | 50 | No |
| Control, CEROX 1663 15% wt/vol | 17 | 1 | Yes |

The materials listed in the first column of Table I are commercially available surfactants. Mirek E30 is a commercially available $CeO_2$ slurry manufactured by Mitsui Corporation of Japan. Oakite PCL is manufactured by Oakite Corporation located in Livermore, Calif. Amberclean 520 is manufactured by Innovative Organics, located in Anaheim, Calif. NuRinse BR 10 is manufactured by NuGeneration Technologies, located in Sacramento, Calif. HDC 905 is manufactured by Mipox Corporation, located in Hayward, Calif. Mipox 2305 is also manufactured by Mipox. SP2200 and SP2201 are manufactured by Valtech Corp., located in Pughtown, Pa. In all cases in Table I, the surfactant had a concentration of 5% wt/vol.

As can be seen from the above data, sodium polyacrylate, POIZ 530 and HIPOCHEM SS-100 act as dispersing agents. In other words, they facilitate redispersion of the slurry. They also markedly reduce the slurry settling rate, and exhibit very little foaming. Thus, as can be seen from the above data, the polyacrylate additives improve the slurry stability at a cost of very little foaming.

I have also discovered that it is easier to clean a substrate after polishing with a slurry in accordance with the present invention. I generated a first atomic force microscope ("AMF") image of a glass ceramic substrate after polishing with a $CeO_2$ slurry and "kiss" cleaning with Poiz 530 surfactant. ("Kiss cleaning means cleaning the substrate with a solution lacking $CeO_2$ particles.) I generated a second AMF image of a similar glass ceramic substrate after polishing, but cleaned with a solution lacking a polyacrylate surfactant. One could see residual CeO2 particles (white dots) in the second image but not the first image. I believe that the reason for this is that the surfactant is negatively charged, lightly clings to the $CeO_2$ particles, and prevents these particles from adhering to the negatively charged glass. Therefore, the $CeCO_2$ particles are easier to remove from the substrate in a post-polishing cleaning step.

Theoretical Explanation for the Improved Result

I believe that the reason sodium polyacrylate enhances the polishing rate of the slurry is that CeO2 particles in an aqueous solution are generally positively charged. The glass is negatively charged. The polyacrylate is generally negatively charged and clings to the positively charged CeO2 particles. In particular, the polyacrylate surfactant adsorbs on the particle surface by forming an open structured monolayer and provides stability against settling by an electrostatic repulsion mechanism. Since the polymer chains are negatively charged, in both neutral and high pHs, the interactions with a negatively charged surface of the glass is practically nonexistent so that adhesion is minimized. Also, the negatively charged polyacrylate coating on the CeO2 particles tends to repel the other polyacrylate-coated particles, thereby preventing the particles from agglomerating. However, during polishing, the $CeO_2$ particles are pushed downward against the glass by a polishing pad, thereby overcoming any electrostatic repulsion between the polyacrylate and glass, and permitting the $CeO_2$ particles to be used for chemical-mechanical polishing of the substrate.

Ideally, one would prefer to have surfactant molecules tightly bonded to the surface of the $CeO_2$ particles so that the interactions between the particles are not adhesive or permanent. This should result in stable (slowly settling) dispersions that provide maximum numbers of particles capable of interacting with the glass surface, However, for a chemically driven polishing processes, it is not advisable to have the surfactant molecules adhering strongly to the $CeO_2$ particle surface since such a barrier would inhibit the particle/surface interactions and would affect interfacial chemistry negatively, ($CeO_2$ polishing is a chemical-mechanical process.) In this case, the polyacrylate suifactant does not strongly adhere to the $CeO_2$ particle surface.

Because the $CeO_2$ particles do not tend to agglomerate, there is more particle surface area available for polishing the glass than there would be if the surfactant were absent and the particles did agglomerate. This theory is confirmed by analysis with a Horiba Particle size analyzer. This analyzer confirms that in the absence of a surfactant, the median C7 rrv size of the $CeO_2$ particles was 1.52 microns in diameter. However, by adding 4% Hipochem polyacrylate to the slurry, the $CeO_2$ particle size reduced to 1.05 microns in diameter. This demonstrates reduced particle aggregation.

Polishing Apparatus for Use With the Novel Slurry

Figure 2A:
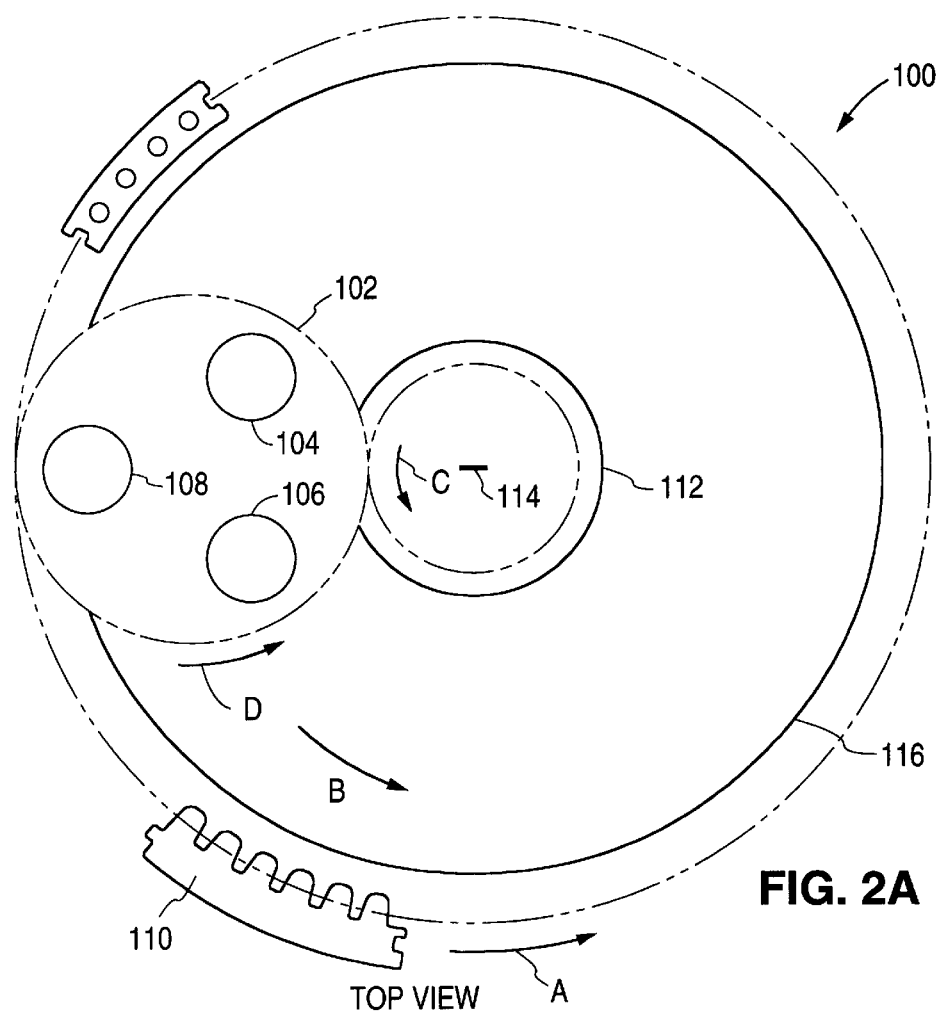
FIGS. 2A and 2B illustrate a planetary polishing apparatus for polishing a substrate.
Figure 2B:
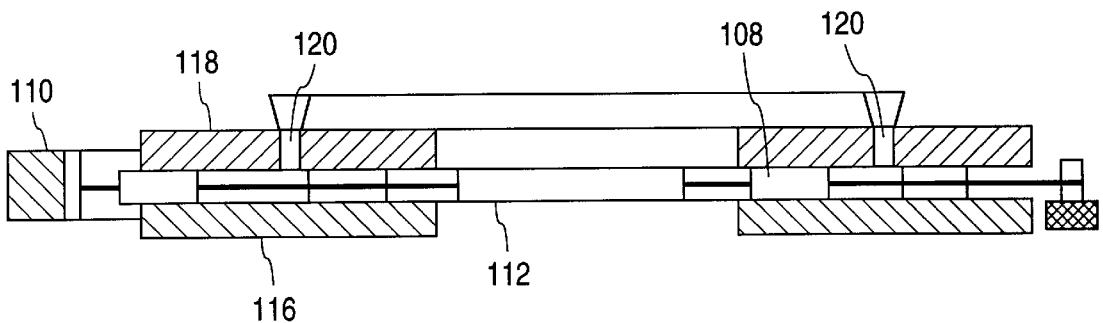

The slurry of the present invention can be used in accordance with any of a number of polishing apparatuses. For example, in one embodiment, the slurry is used in accordance with planetary polishing apparatus, e.g. such as manufactured by Speedfam Corporation of Chandler, Ariz. An example of such apparatus is apparatus 100 shown in shown in FIGS. 2A and 2B. Referring to FIGS. 2A and 2B, polisher 100 includes a circular disk holder 102 that holds disks 104, 106 and 108 during polishing. Although only three disks 104, 106 and 108 are held by one holder 102 in FIG. 2A, the above-mentioned Speedfam polisher simultaneously polishes 42 substrates.

During polishing, a gear 110 rotates in the direction of arrow A around a central circular member 112, causing holder 102 to move around member 112 in a direction B. Simultaneously, central circular member 112 rotates in a direction C, about its center 114 and holder 102 rotates around its central axis in direction a D.

Simultaneously, bottom lap surface 116 and top lap surface 118 rub against the polish disks 104, 106 and 108. Slurry is applied to the regions between the lapping pads 116, 118 and disks 104 to 108 via channels 120.

Figure 3:
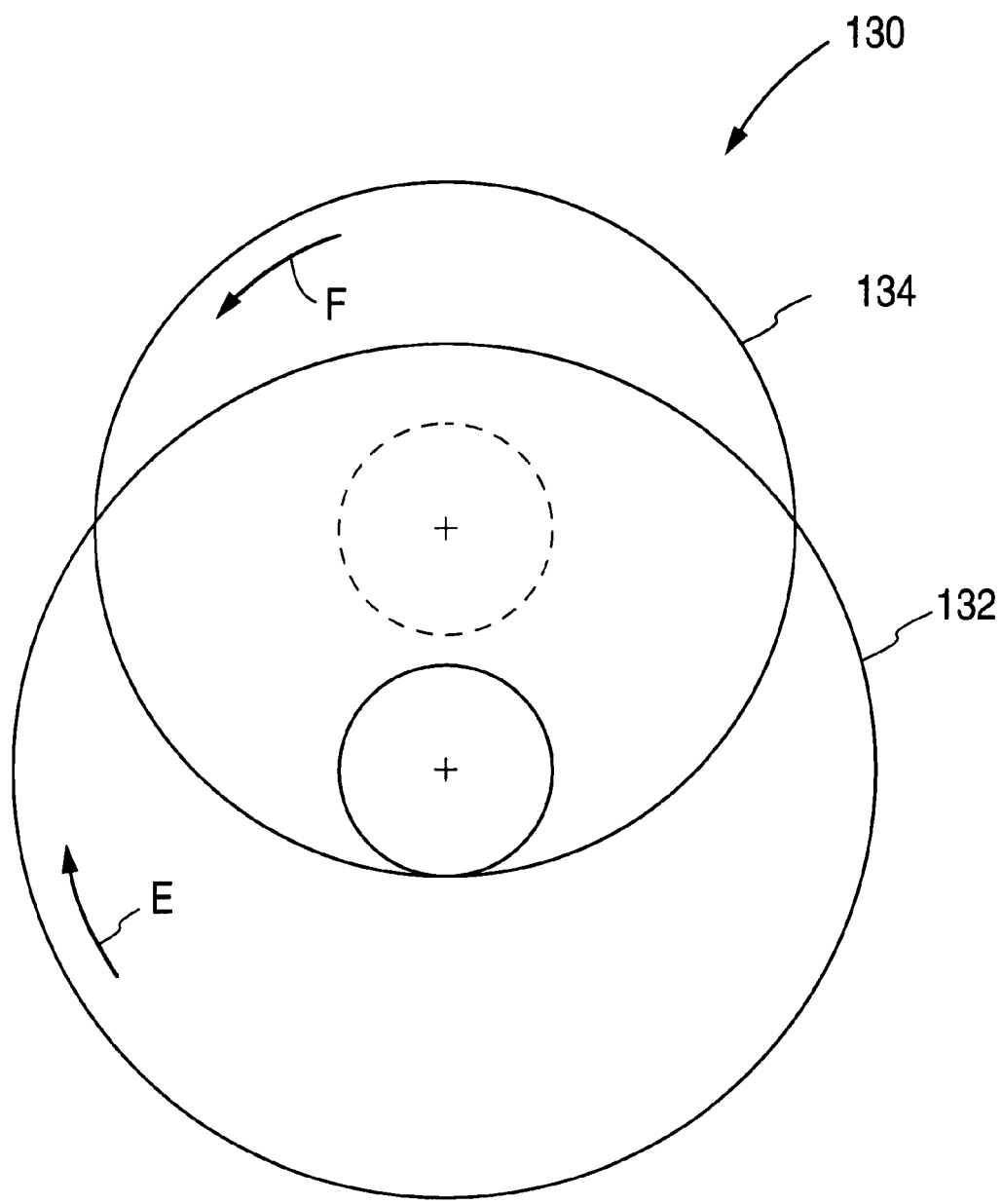
FIG. 3 illustrates a single disk polisher for polishing a substrate.

In another embodiment, a single-disk type polisher is used to polish the glass ceramic substrate. Such a disk polisher can have a structure similar to a Strasbaugh 6DEDC-25P2 texturing apparatus. FIG. 3 schematically shows a single disk polishing apparatus 130 for polishing a substrate 132 with a polishing pad 134. During polishing, disk 132 rotates in a direction E while pad 134 presses against disk 132 and rotates in a direction F. One side of substrate 132 is polished at a time. The slurry of the present invention is introduced between pad 134 and substrate 132.

Figure 4:
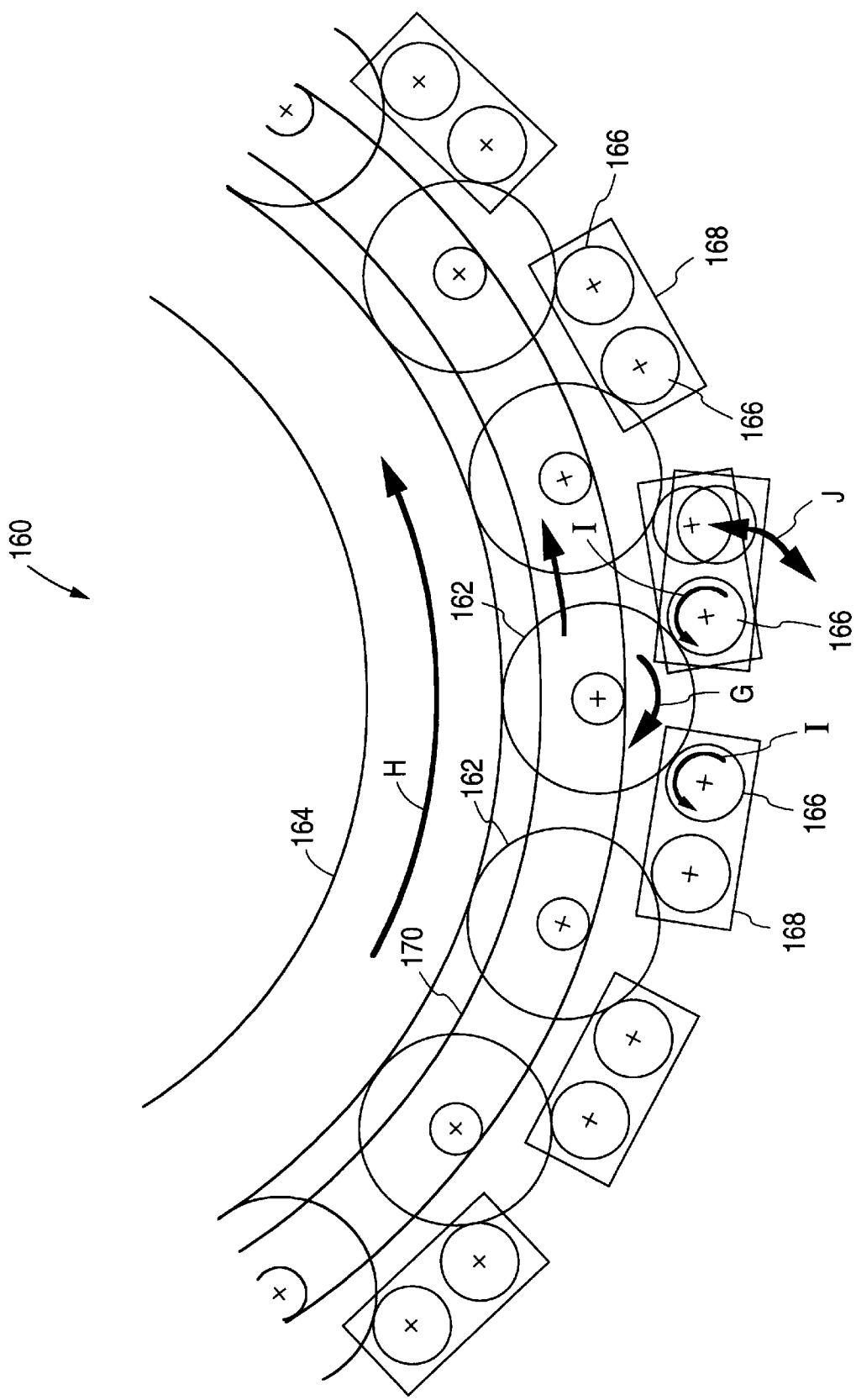
FIG. 4 illustrates a ring polisher for polishing a substrate.

In yet another embodiment, a ring type polisher is used to polish the substrate. In one embodiment, the ring type polisher can be an MDS ring polisher available from Speedfam. FIG. 4 schematically shows a ring polisher 160 for polishing substrates 162. During polishing, disks 162 are rotated in a direction G by the motion of a center driving ring 164 in direction H. Substrates 162 are urged against ring 164 by pivoting stanchions 166. (Pivoting stanchions 166 are mounted to stanchion assemblies 168. During use, stanchions 166 are caused to rotate in direction I by the motion of substrates 162.)

During use, while substrates 162 are rotated by center driving ring 164, a lower polishing platen 170 presses against substrates 162 to thereby polish the lower surface of substrates 162. Simultaneously, an upper platen (not shown, but having the same lateral extent as lower platen 170) pushes down on substrates 162 to thereby polish the upper surface of substrates 162, A slurry in accordance with my invention is introduced into the space between the platens and substrates 162.

Other Embodiments of a Slurry In Accordance With the Present Invention

A typical composition in accordance with my invention comprises about 5% wt/vol of polyacrylate and between 15 to 25% wt/vol $CeO_2$ particles in water. However, in other embodiments, the concentration of polyacrylate can be between 0.2 and 7% wt/vol., and the concentration of $CeO_2$ particles is between 1 and 20% wt/vol. In addition, the slurry can have other surfactants and additives, e.g. sodium dodecyl sulfate. During polishing, because of friction and other heat generation mechanisms, the slurry is sometimes heated during polishing. Accordingly, in one embodiment, I reduce the temperature of the slurry to 10 to 15° C. before it is introduced between the polishing pad and the substrate. However, in other embodiments, I leave the slurry at room temperature prior to introduction into the polishing apparatus.

Completion of the Magnetic Disk

Figure 5:
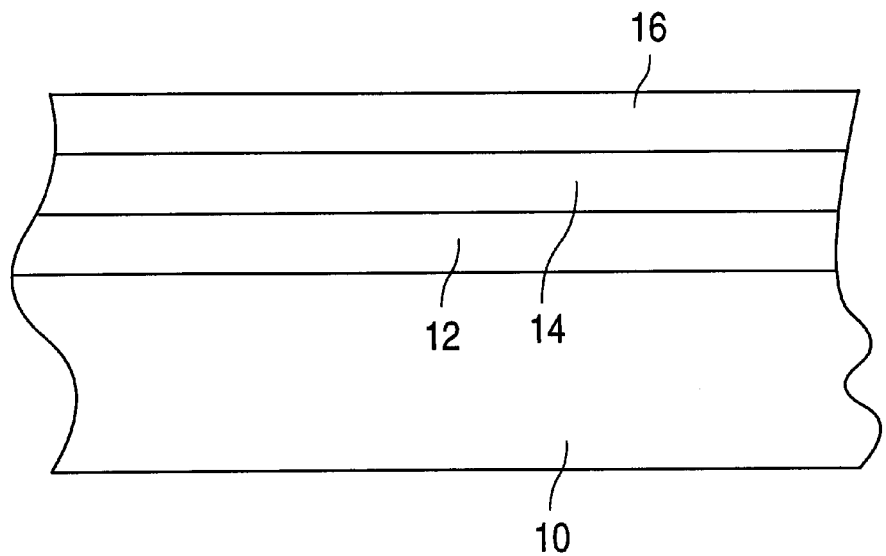
FIG. 5 illustrates in cross section a magnetic disk manufactured using a process in accordance with my invention.

Referring to FIG. 5, to complete the manufacture of a magnetic disk, an underlayer 12, a magnetic alloy layer 14 and a protective overcoat 16, are deposited (e.g. by sputtering), in that order, on the substrate (designated with reference number 10). The underlayer can be Cr, a Cr alloy, NiP, NiAl or other material. Underlayer 12 serves as a nucleation layer for controlling crystal growth of the magnetic layer. In addition, the underlayer can enhance certain magnetic characteristics (e.g. the magnetic coercivity) of magnetic alloy layer 14. The magnetic alloy can be a Co alloy, and the protective overcoat can be carbon or hydrogenated carbon. Thereafter, a lubricant layer is applied to the protective overcoat.

While the invention has been described with respect to specific embodiments, those skilled in the art will appreciate that changes can be made in form and detail without departing from the spirit and scope of the invention. For example, chemically strengthened or non-chemically strengthened glass can be used. In addition, other silica-containing substrates can be used. Also, colloidal or non-colloidal $CeO_2$ can be used. Accordingly, all such changes come within our invention.

I claim:

1. A method for polishing a silica-containing substrate, said substrate having a surface, said method comprising:

applying a polishing pad against the surface of said substrate;

introducing a slurry between said polishing pad and said surface, said slurry comprising polishing particles and a polyacrylate in an aqueous solution; and depositing a magnetic film on said substrate after said step of polishing said substrate.

2. Method of claim 1 wherein said slurry comprises between 1 and 20% wt/vol. $CeO_2$ particles and between 0.2 and 7% wt/vol. of said polyacrylate.

3. Method of claim 1 further comprising forming an underlayer between said substrate and said magnetic film and a protective overcoat over said magnetic film.

4. Method of claim 1 wherein said polyacrylate increases the polishing rate during said polishing.

5. Method of claim 1 wherein said polishing particles comprise an oxide material.

6. Method of claim 1 wherein said polishing particles comprise one or more materials selected from the group consisting of $ZrO_2$, $ThO_2$, $SnO_2$, $Cr_2O_3$, $Al_2O_3$ and $Fe_2O_3$.

7. Method of claim 6 wherein said slurry also comprises $CeO_2$ particles.

8. Method of claim 6 wherein said slurry comprises a mixture of polishing particles, said mixture comprising two or more materials selected from the group consisting of $ZrO_2$, $ThO_2$, $SnO_2$, $Cr_2O_3$, $Al_2O_3$ and $Fe_2O_3$.

9. Method of claim 1 wherein said polyacrylate comprises a monovalent cation.

10. Method of claim 1 wherein said polyacrylate comprises sodium polyacrylate, potassium polyacrylate or ammonium polyacrylate.

11. Method of claim 7 wherein said $CeO_2$ particles have a size between 0.5 and 3 microns.

12. Method of claim 1 wherein the concentration of said polyacrylate is between 2 and 6% wt/vol.

13. A method for polishing a silica substrate, said substrate having a surface, said method comprising:

applying a polishing pad against the surface of said substrate;

introducing a slurry between said polishing pad and said surface, said slurry comprising polishing particles and a polyacrylate in an aqueous solution; and depositing a magnetic film on said substrate after said step of polishing said substrate.

14. Method of claim 13 further comprising forming an underlayer between said substrate and said magnetic film and a protective overcoat over said magnetic film.

15. Method of claim 1 wherein said substrate comprises glass ceramic.

16. Method of claim 1 wherein said substrate comprises glass.

17. A method for polishing a silica-containing substrate, said substrate having a surface, said method comprising:

applying a polishing pad against the surface of said substrate;

introducing a slurry between said polishing pad and said surface, said slurry comprising polishing particles and a polyacrylate in a solution; and depositing a magnetic film on said substrate after said step of polishing said substrate.

* * * * *